(12) United States Patent
Kwon et al.

(10) Patent No.: US 9,769,746 B2
(45) Date of Patent: Sep. 19, 2017

(54) OPERATION METHOD OF STATION IN WIRELESS LOCAL AREA NETWORK

(71) Applicant: NEWRACOM INC., Irvine, CA (US)

(72) Inventors: Hyoung Jin Kwon, Daejeon (KR); Min Ho Cheong, Daejeon (KR); Hee Jung Yu, Daegu (KR)

(73) Assignee: NEWRACOM, INC., Irvine, CA (US)

( * ) Notice: Subject to any disclaimer, the term of this patent is extended or adjusted under 35 U.S.C. 154(b) by 126 days.

(21) Appl. No.: 14/736,068

(22) Filed: Jun. 10, 2015

(65) Prior Publication Data
US 2015/0358904 A1 Dec. 10, 2015

(30) Foreign Application Priority Data

Jun. 10, 2014 (KR) .................. 10-2014-0070336
Jun. 9, 2015 (KR) .................. 10-2015-0081311

(51) Int. Cl.
| | |
|---|---|
| *H04W 24/08* | (2009.01) |
| *H04W 52/02* | (2009.01) |
| *H04W 72/04* | (2009.01) |
| *H04W 74/08* | (2009.01) |
| *H04W 88/08* | (2009.01) |
| *H04W 52/24* | (2009.01) |
| *H04W 52/26* | (2009.01) |
| *H04W 52/28* | (2009.01) |

(52) U.S. Cl.
CPC ....... *H04W 52/0206* (2013.01); *H04W 24/08* (2013.01); *H04W 74/0808* (2013.01); *H04W 52/241* (2013.01); *H04W 52/242* (2013.01); *H04W 52/243* (2013.01); *H04W 52/265* (2013.01); *H04W 52/287* (2013.01); *H04W 88/08* (2013.01)

(58) Field of Classification Search
None
See application file for complete search history.

(56) References Cited

U.S. PATENT DOCUMENTS

| | | | | |
|---|---|---|---|---|
| 2008/0125160 A1* | 5/2008 | Zhu | ............... | H04W 52/20 455/522 |
| 2014/0287769 A1* | 9/2014 | Taori | ............... | H04W 74/0808 455/450 |
| 2014/0328270 A1* | 11/2014 | Zhu | ............... | H04W 74/002 370/329 |
| 2015/0163824 A1* | 6/2015 | Krzymien | ............... | H04W 28/18 370/338 |
| 2015/0289212 A1* | 10/2015 | Januszewski | ....... | H04W 52/243 370/329 |
| 2016/0127909 A1* | 5/2016 | Huang | ............... | H04L 5/0062 370/329 |
| 2016/0165549 A1* | 6/2016 | Zhang | ............... | H04W 52/243 370/329 |

* cited by examiner

*Primary Examiner* — Phuc Tran
*Assistant Examiner* — Soon-Dong D Hyun

(57) ABSTRACT

Disclosed are operation method of station in wireless local area network. An operation method comprises setting transmission power of a frame; setting a clear channel assessment (CCA) threshold based on a difference between the set transmission power and a default value of the transmission power; and performing a CCA operation based on the set CCA threshold. Therefore, performance of WLAN can be enhanced.

6 Claims, 11 Drawing Sheets

OPERATION METHOD OF STATION IN WIRELESS LOCAL AREA NETWORK

CLAIM FOR PRIORITY

This application claims priority to Korean Patent Application No. 2014-0070336 filed on Jun. 10, 2014 and No. 2015-0081311 filed on Jun. 9, 2015 in the Korean Intellectual Property Office (KIPO), the entire contents of which are hereby incorporated by reference.

BACKGROUND

1. Technical Field

Example embodiments of the present invention relate in general to wireless local area network (WLAN) technology and more specifically to an operation method of a station in consideration of fairness with respect to another station upon frame transmission.

2. Related Art

With the development of information communication technologies, a variety of wireless communication technologies have been developed. Among these technologies, wireless local area network (WLAN) is a technology that Internet access is possible in a wireless way in homes, business or specific service providing areas, using portable terminal such as personal digital assistant (PDA), a laptop computer, a portable multimedia player (PMP), or the like, based on wireless frequency technologies.

WLAN technologies are created and standardized by the IEEE 802.11 Working Group under IEEE 802 Standard Committee. As such WLAN technology becomes more prevalent and its applications become more diverse, there is increasing demand for new WLAN technology that can support a higher throughput than existing WLAN technologies. Very high throughput (VHT) WLAN technology is proposed to support a data rate of 1 Gbps and higher. A WLAN technology according to IEEE 802.11ac standard is a technology providing VHT in sub 6 GHz band, and A WLAN technology according to IEEE 802.11ad standard is a technology providing VHT in 60 GHz band.

In addition to the above-described standards, various standards on WLAN technologies have been developed, and are being developed. As representative recent technologies, a WLAN technology according to IEEE 802.11af standard is a technology which has been developed for WLAN operation in TV white space bands, and a WLAN technology according to IEEE 802.11ah standard is a technology which has been developed for supporting a great number of stations operating with low power in sub 1 GHz band, and a WLAN technology according to IEEE 802.11ai standard is a technology which has been developed for supporting fast initial link setup (FILS) in WLAN systems. Also, IEEE 802.11ax standard is being developed for enhancing frequency efficiency of dense environments in which numerous access points and stations exist.

In a system based on such WLAN technology, when a first station performs a clear channel assessment (CCA) operation based on a value greater than a default value of a CCA threshold, a second station may not obtain a frame transmission opportunity due to a frame transmitted from the first station. That is, when the CCA operation is performed on the basis of the value greater than the default value of the CCA threshold, fairness between stations may be degraded.

SUMMARY

Accordingly, example embodiments of the present invention are provided to substantially obviate one or more problems due to limitations and disadvantages of the related art.

Example embodiments of the present invention provide an operation method of a station in consideration of fairness with respect to another station.

In order to achieve the objectives of the present invention, an operation method performed by a station, the operation method comprises setting transmission power of a frame; setting a clear channel assessment (CCA) threshold based on a difference between the set transmission power and a default value of the transmission power; and performing a CCA operation based on the set CCA threshold.

In addition, the operation method further comprises when a channel is determined to be in an idle state by the CCA operation, transmitting the frame at the set transmission power.

Here, the transmission power is set based on at least one of a location, a density state, and an interference state of a basic service set (BSS) to which the station belongs.

Here, the CCA threshold is set to a value greater than a default value of the CCA threshold when the set transmission power is less than the default value of the transmission power.

Here, the CCA threshold is set to a value less than or equal to a default value of the CCA threshold when the set transmission power is greater than or equal to the default value of the transmission power.

In order to achieve the objectives of the present invention, an operation method performed by a station, the operation method comprises setting a clear channel assessment (CCA) threshold; setting a power transmission of a frame based on a difference between the set CCA threshold and a default value of the CCA threshold; and performing a CCA operation based on the set CCA threshold.

In addition, the operation method further comprises, when a channel is determined to be in an idle state by the CCA operation, transmitting the frame at the set transmission power.

Here, the CCA threshold is set based on at least one of a location, a density state, and an interference state of a basic service set (BSS) to which the station belongs.

Here, when the set CCA threshold is greater than the default value of the CCA threshold, the transmission power is set to a value less than a default value of the transmission power.

Here, when the set CCA threshold is less than or equal to the default value of the CCA threshold, the transmission power is set to a value greater than or equal to a default value of the transmission power.

In order to achieve the objectives of the present invention, an operation method performed by a station, the operation method comprises setting a clear channel assessment (CCA) threshold based on a characteristic of data included in a frame; and performing a CCA operation based on the set CCA threshold.

In addition, the operation method further comprises setting transmission power of the frame based on a difference between the set CCA threshold and a default value of the CCA threshold; and when a channel is determined to be in an idle state by the CCA operation, transmitting the frame at the set transmission power.

Here, wherein the CCA threshold is set based on a transmission priority of the data.

In order to achieve the objectives of the present invention, an operation method performed by a first station, the operation method comprises identifying standard information supported by a second station that has transmitted a frame detected by a CCA operation based on a first clear channel assessment (CCA) threshold; when a standard supported by the second station is a lower version than a standard supported by the first station, identifying a basic service set (BSS) to which the second station belongs; when the second station belongs to an overlapping BSS (OBSS), changing a CCA threshold of the first station to a second CCA threshold greater than the first CCA threshold; and performing a CCA operation based on the second CCA threshold.

In addition, the operation method further comprises setting transmission power of the frame to a value less than a default value of the transmission power; and when a channel is determined to be in an idle state by a CCA operation based on the second CCA threshold, transmitting a frame at the set transmission power.

Here, the standard information supported by the second station is identified by an auto detection operation on a preamble of the frame.

Here, the BSS to which the second station belongs is identified by BSS indicating information included in a preamble of the frame or BSS indicating information included in a medium access control (MAC) header of the frame.

Here, the first CCA threshold is changed to the second CCA threshold when a received signal strength of the frame is greater than the first CCA threshold and less than the second CCA threshold.

Here, the first CCA threshold is changed to the second CCA threshold when the frame is an uplink frame or a frame used for direct communication between stations.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
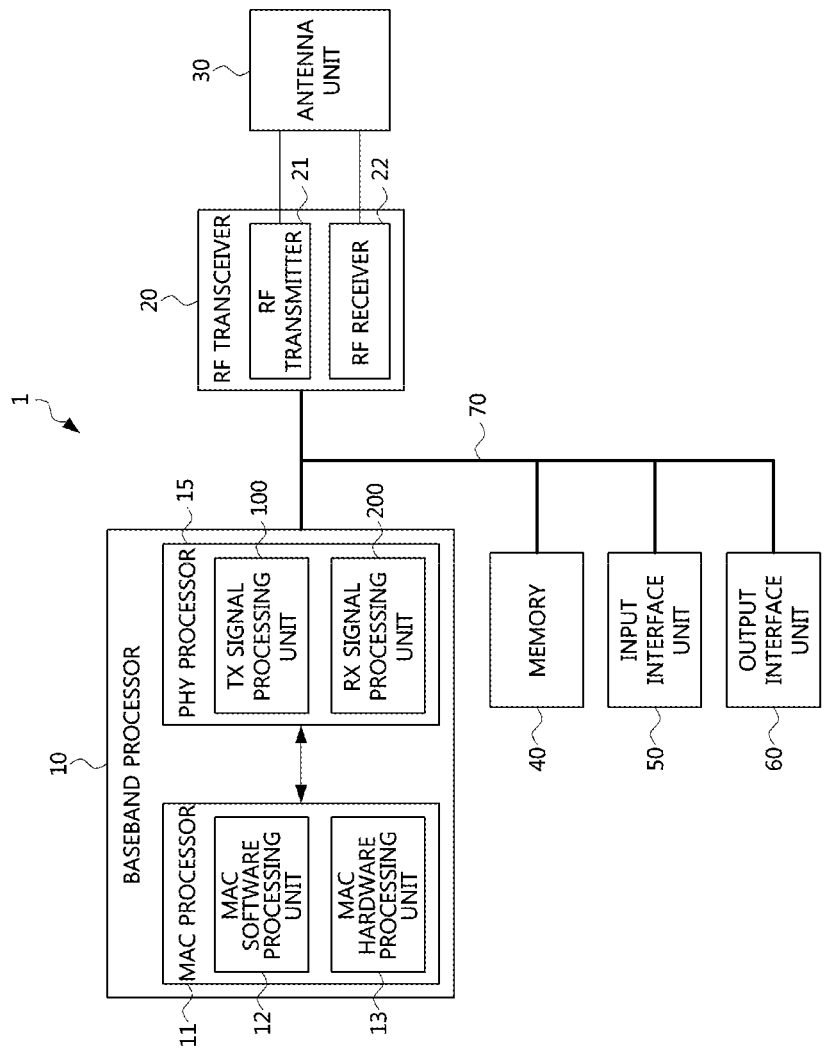
FIG. 1 is a block diagram illustrating a structure of a WLAN device.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In a wireless local area network (WLAN), a basic service set (BSS) includes a plurality of WLAN devices. The WLAN device may include a medium access control (MAC) layer and a physical (PHY) layer according to IEEE (Institute of Electrical and Electronics Engineers) 802.11 standard. In the plurality of WLAN devices, at least one WLAN device may be an access point and the other WLAN devices may be non-AP stations (non-AP STAs). Alternatively, all the plurality of WLAN devices may be non-AP STAs in Ad-hoc networking. In general, the AP STA and the non-AP STA may be collectively called the STA. However, for easy description, only the non-AP STA may be called the STA.

FIG. 1 is a block diagram illustrating a structure of a WLAN device.

Referring to FIG. 1, the WLAN device 1 may include a baseband processor 10, a radio frequency (RF) transceiver 20, an antenna unit 30, a memory 40, an input interface unit 50, an output interface unit 60, and a bus 70. The baseband processor 10 may perform baseband signal processing, and may include a MAC processor 11 and a PHY processor 15.

In one embodiment, the MAC processor 11 may include a MAC software processing unit 12 and a MAC hardware processing unit 13. The memory 40 may store software (hereinafter referred to as "MAC software") including at least some functions of the MAC layer. The MAC software processing unit 12 executes the MAC software to implement the some functions of the MAC layer, and the MAC hardware processing unit 13 may implement remaining functions of the MAC layer as hardware (hereinafter referred to "MAC hardware"). However, the MAC processor 11 is not limited to this. The PHY processor 15 may include a transmitting signal processing unit 100 and a receiving signal processing unit 200.

The baseband processor 10, the memory 40, the input interface unit 50, and the output interface unit 60 may communicate with each other via the bus 70. The RF transceiver 20 may include an RF transmitter 21 and an RF receiver 22. The memory may further store an operating system and applications. The input interface unit 50 receives information from a user, and the output interface unit 60 outputs information to the user.

The antenna unit 30 includes one or more antennas. When multiple-input multiple-output (MIMO) or multi-user MIMO (MU-MIMO) is used, the antenna unit 30 may include a plurality of antennas.

Figure 2:
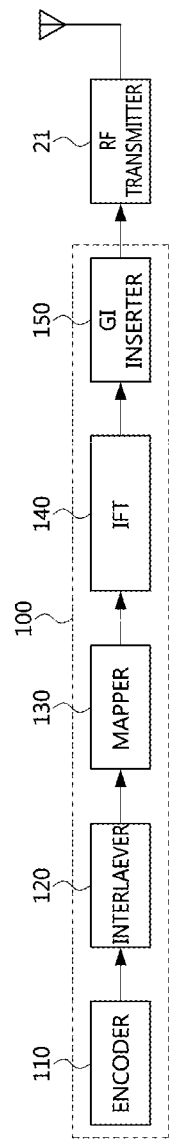
FIG. 2 is a schematic block diagram illustrating a transmitting signal processing unit in a WLAN.

FIG. 2 is a schematic block diagram illustrating a transmitting signal processing unit in a WLAN.

Referring to FIG. 2, a transmitting signal processing unit 100 may include an encoder 110, an interlaever 120, a mapper 130, an inverse Fourier transformer (IFT) 140, and a guard interval (GI) inserter 150.

The encoder 110 encodes input data. For example, the encoder 100 may be a forward error correction (FEC) encoder. The FEC encoder may include a binary convolutional code (BCC) encoder followed by a puncturing device, or may include a low-density parity-check (LDPC) encoder.

The transmitting signal processing unit 100 may further include a scrambler for scrambling the input data before the encoding to reduce the probability of long sequences of 0s or 1s. If BCC encoding is used in the encoder, the transmitting signal processing unit 100 may further include an encoder parser for demultiplexing the scrambled bits among a plurality of BCC encoders. If LDPC encoding is used in the encoder, the transmitting signal processing unit 100 may not use the encoder parser.

The interleaver 120 interleaves the bits of each stream output from the encoder to change order of bits. Interleaving may be applied only when BCC encoding is used. The mapper 130 maps the sequence of bits output from the interleaver to constellation points. If the LDPC encoding is used in the encoder, the mapper 130 may further perform LDPC tone mapping besides the constellation mapping.

When the MIMO or the MU-MIMO is used, the transmitting signal processing unit 100 may use a plurality of interleavers 120 and a plurality of mappers corresponding to the number of NSS of spatial streams. In this case, the transmitting signal processing unit 100 may further include a stream parser for dividing outputs of the BCC encoders or the LDPC encoder into blocks that are sent to different interleavers 120 or mappers 130. The transmitting signal processing unit 100 may further include a space-time block code (STBC) encoder for spreading the constellation points from the NSS spatial streams into NSTS space-time streams and a spatial mapper for mapping the space-time streams to transmit chains. The spatial mapper may use direct mapping, spatial expansion, or beamforming.

The IFT 140 converts a block of the constellation points output from the mapper 130 or the spatial mapper to a time domain block (i.e., a symbol) by using an inverse discrete Fourier transform (IDFT) or an inverse fast Fourier transform (IFFT). If the STBC encoder and the spatial mapper are used, the inverse Fourier transformer 140 may be provided for each transmit chain.

When the MIMO or the MU-MIMO is used, the transmitting signal processing unit 100 may insert cyclic shift diversities (CSDs) to prevent unintentional beamforming. The CSD insertion may occur before or after the inverse Fourier transform. The CSD may be specified per transmit chain or may be specified per space-time stream. Alternatively, the CSD may be applied as a part of the spatial mapper. When the MU-MIMO is used, some blocks before the spatial mapper may be provided for each user.

The GI inserter 150 prepends a GI to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When the MIMO or the MU-MIMO is used, the GI inserter 150 and the RF transmitter 21 may be provided for each transmit chain.

Figure 3:
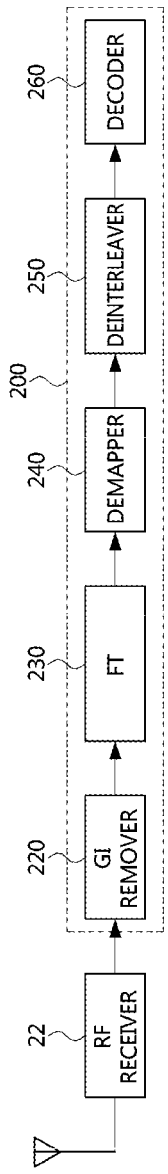
FIG. 3 is a schematic block diagram illustrating a receiving signal processing unit in the WLAN.

FIG. 3 is a schematic block diagram illustrating a receiving signal processing unit in the WLAN.

Referring to FIG. 3, a receiving signal processing unit 200 may include a GI remover 220, a Fourier transformer (FT) 230, a demapper 240, a deinterleaver 250, and a decoder 260. An RF receiver 22 receives an RF signal via the antenna unit 30 and converts the RF signal into the symbols. The GI remover 220 removes the GI from the symbol. When the MIMO or the MU-MIMO is used, the RF receiver 22 and the GI remover 220 may be provided for each receive chain.

The FT 230 converts the symbol (i.e., the time domain block) into a block of the constellation points by using a discrete Fourier transform (DFT) or a fast Fourier transform (FFT). The Fourier transformer 230 may be provided for each receive chain. When the MIMO or the MU-MIMO is used, the receiving signal processing unit 200 may a spatial demapper for converting the Fourier transformed receiver chains to constellation points of the space-time streams, and an STBC decoder for despreading the constellation points from the space-time streams into the spatial streams.

The demapper 240 demaps the constellation points output from the Fourier transformer 230 or the STBC decoder to the bit streams. If the LDPC encoding is used, the demapper 240 may further perform LDPC tone demapping before the constellation demapping. The deinterleaver 250 deinterleaves the bits of each stream output from the demapper 240. Deinterleaving may be applied only when BCC encoding is used.

When the MIMO or the MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining the streams output from the deinterleavers 250.

The decoder 260 decodes the streams output from the deinterleaver 250 or the stream deparser. For example, the decoder 100 may be an FEC decoder. The FEC decoder may include a BCC decoder or an LDPC decoder. The receiving signal processing unit 200 may further include a descrambler for descrambling the decoded data. If BCC decoding is used in the decoder, the receiving signal processing unit 200 may further include an encoder deparser for multiplexing the data decoded by a plurality of BCC decoders. If LDPC decoding is used in the decoder 260, the receiving signal processing unit 100 may not use the encoder deparser.

Figure 4:
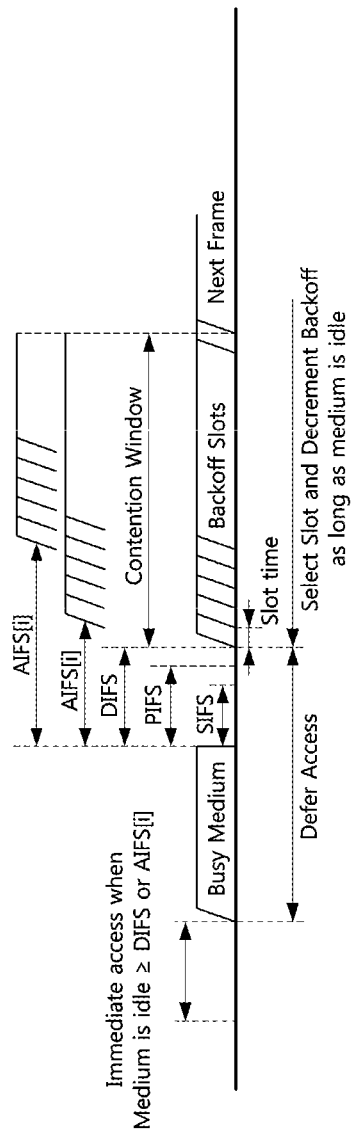
FIG. 4 is a timing diagram illustrating interframe space (IFS) relationships.

FIG. 4 is a timing diagram illustrating interframe space (IFS) relationships.

Referring to FIG. 4, a data frame, a control frame, or a management frame may be exchanged between WLAN devices. The data frame is used for transmission of data forwarded to a higher layer. The WLAN device transmits the data frame after performing backoff if a distributed coordination function IFS (DIFS) has elapsed from a time when the medium has been idle.

The management frame is used for exchanging management information which is not forwarded to the higher layer. Subtype frames of the management frame include a beacon frame, an association request/response frame, a probe request/response frame, and an authentication request/response frame. The control frame is used for controlling access to the medium. Subtype frames of the control frame include a request to send (RTS) frame, a clear to send (CTS) frame, and an acknowledgement (ACK) frame. In the case that the control frame is not a response frame of the other frame, the WLAN device transmits the control frame after performing backoff if the DIFS has elapsed. In the case that the control frame is the response frame of the other frame, the WLAN device transmits the control frame without performing backoff if a short IFS (SIFS) has elapsed. The type and subtype of frame may be identified by a type field and a subtype field in a frame control field.

On the other hand, a Quality of Service (QoS) STA may transmit the frame after performing backoff if an arbitration IFS (AIFS) for access category (AC), i.e., AIFS[AC] has elapsed. In this case, the data frame, the management frame, or the control frame which is not the response frame may use the AIFC[AC].

Figure 5:
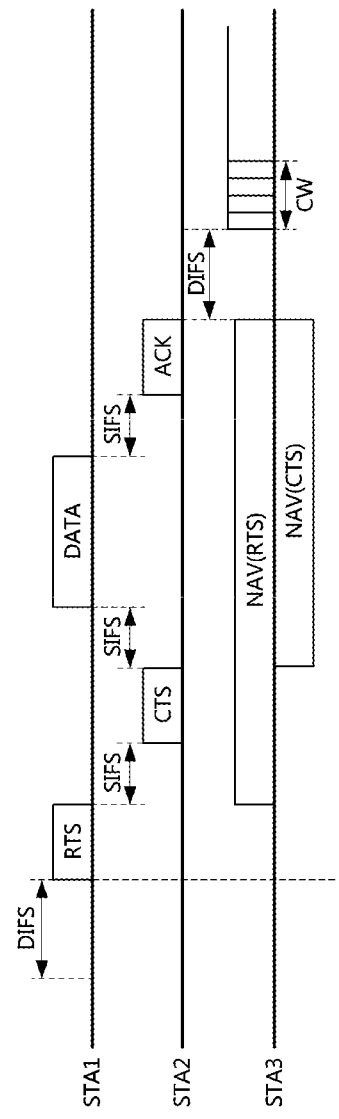
FIG. 5 is a timing diagram illustrating a frame transmission procedure based on a CSMA (carrier sense multiple access)/CA (collision avoidance) manner for avoiding collision between frames in a channel.

FIG. 5 is a timing drawing illustrating a frame transmission procedure based on a CSMA (carrier sense multiple access)/CA (collision avoidance) manner for avoiding collision between frames in a channel.

Referring to FIG. 5, STA1 is a transmit WLAN device for transmitting data, STA2 is a receive WLAN device for receiving the data, and STA3 is a WLAN device which may be located at an area where a frame transmitted from the STA1 and/or a frame transmitted from the STA2 can be received by the WLAN device.

The STA1 may determine whether the channel is busy by carrier sensing. The STA1 may determine the channel occupation based on an energy level on the channel or correlation of signals in the channel, or may determine the channel occupation by using a network allocation vector (NAV) timer.

When determining that the channel is not used by other devices during DIFS (that is, the channel is idle), the STA1 may transmit an RTS frame to the STA2 after performing backoff. Upon receiving the RTS frame, the STA2 may transmit a CTS frame as a response of the CTS frame after SIFS.

When the STA3 receives the RTS frame, it may set the NAV timer for a transmission duration of subsequently transmitted frames (for example, a duration of SIFS+CTS frame duration+SIFS+data frame duration+SIFS+ACK frame duration) by using duration information included in the RTS frame. When the STA3 receives the CTS frame, it may set the NAV timer for a transmission duration of subsequently transmitted frames (for example, a duration of SIFS+data frame duration+SIFS+ACK frame duration) by using duration information included in the RTS frame. Upon receiving a new frame before the NAV timer expires, the STA3 may update the NAV timer by using duration information included in the new frame. The STA3 does not attempt to access the channel until the NAV timer expires.

When the STA1 receives the CTS frame from the STA2, it may transmit a data frame to the STA2 after SIFS elapses from a time when the CTS frame has been completely received. Upon successfully receiving the data frame, the STA2 may transmit an ACK frame as a response of the data frame after SIFS elapses.

When the NAV timer expires, the STA3 may determine whether the channel is busy by the carrier sensing. Upon determining that the channel is not used by the other devices during DIFS after the NAV timer has expired, the STA3 may attempt the channel access after a contention window according to random backoff operation.

Meanwhile, a first station STA1 may determine an occupancy status (that is, a busy state or an idle state) of a channel on the basis of a clear channel assessment (CCA) operation. The first station STA1 may determine the channel to be in a busy state upon receiving a frame having a signal strength greater than a CCA threshold and may determine the channel to be in an idle state upon receiving a frame having a signal strength less than or equal to the CCA threshold. When the channel is determined to be in an idle state by the CCA operation, the first station STA1 may notify its adjacent stations that the channel is to be used, through an RST/CTS frame exchange procedure. Upon receiving an RTS frame transmitted from the first station STA1, a second station STA2 may set a NAV timer on the basis of a value that is set in a duration field of the RTS frame. The second station STA2 may not access the channel until the NAV timer becomes zero. Here, the CCA threshold is defined in the IEEE 802.11 standard and may be a fixed value. For example, a default value of a CCA threshold for OFDM-based transmission at a bandwidth of 20 MHz may be −82 dBm.

In a region where stations are concentrated, there may be a pair of stations that can transmit/receive a frame through spatial reuse according to locations of a transmission station and a reception station. However, due to the fixed CCA threshold, it is not easy to obtain the effect of the spatial reuse. The effect of the spatial reuse may be obtained by adjusting the CCA threshold. In this case, however, interference with adjacent stations may be increased. That is, there may be a trade-off between the spatial reuse effect through adjustment of the CCA threshold and the interference with the adjacent station. For example, when the second station STA2 is located in a region between CCA coverage corresponding to a CCA threshold of −82 dBm and CCA coverage corresponding to a CCA threshold of −62 dBm, and the first station STA1 performs a CCA operation based on the CCA threshold of −62 dBm, the second station STA2 may receive interference from a frame transmitted from the first station STA1.

Figure 6:
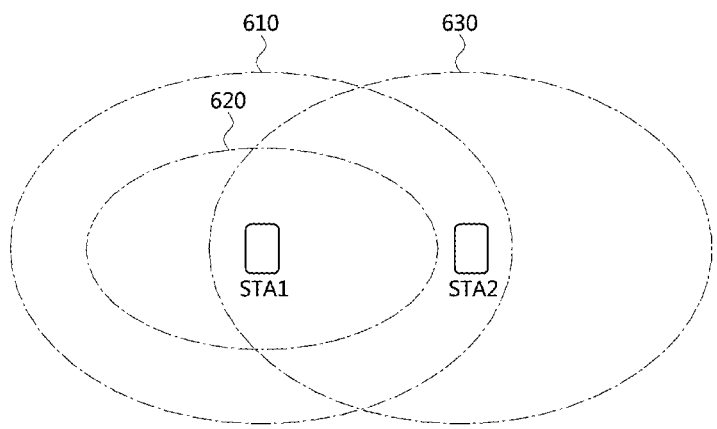
FIG. 6 is a conceptual diagram illustrating a first scenario of a WLAN.

FIG. 6 is a conceptual diagram illustrating a first scenario of a WLAN.

Referring to FIG. 6, the first station STA1 conforms to the IEEE 802.11ax standard. The second station STA2 may conform to earlier IEEE 802.11 standards (e.g., IEEE 802.11a/b/g/n/ac). When the first station STA1 performs a CCA operation based on a first CCA threshold (e.g., −82 dBm), the second station STA2 may be located within first CCA coverage 610 corresponding to the first CCA threshold. In this case, the first station STA1 may determine the channel to be in a busy state due to a frame transmitted from the second station STA2. When the second station STA2 performs a CCA operation based on a third CCA threshold (e.g., −82 dBm), the first station STA1 may be located within third CCA coverage 630 corresponding to the third CCA threshold. That is, the second station STA2 may determine the channel to be in a busy state due to a frame transmitted from the first station STA1.

When the first station STA1 performs a CCA operation based on a second CCA threshold (e.g., −62 dBm) less than the first CCA threshold, the second station STA2 is not located within second CCA coverage 620 corresponding to the second CCA threshold. Accordingly, even when a frame is transmitted from the second station STA2, the first station STA1 may determine the channel to be in an idle state and thus transmit the frame. On the contrary, the second station STA2 may determine the channel to be in a busy state due to the frame transmitted from the first station STA1 and thus may not obtain a frame transmission opportunity. That is, when a CCA threshold of the first station STA1 is increased, the frame transmission opportunity of the second station STA2 may be decreased.

The spatial reuse effect may be obtained through adjustment of transmission power. An additional signaling procedure may be needed to adjust the transmission power. When there is a station that may not adjust transmission power in the WLAN, performance of the WLAN may be degraded. For example, when only the first station STA1 reduces transmission power and the other stations do not reduce transmission power in order to reuse a space in a region where stations are concentrated, the performance of the WLAN may not be enhanced. On the contrary, when the transmission power of the first station STA1 is increased, interference from the adjacent stations may be increased due to the frame transmitted from the first station STA1. In this case, fairness between stations may be degraded.

Figure 7:
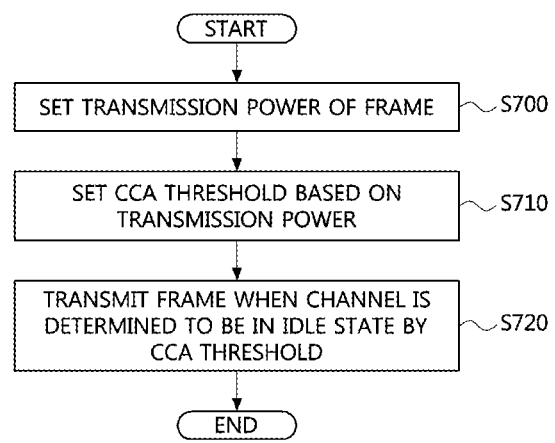
FIG. 7 is a flowchart illustrating a first embodiment of an operation method of a station that performs a CCA operation based on a dynamic CCA threshold.

FIG. 7 is a flowchart illustrating a first embodiment of an operation method of a station that performs a CCA operation based on a dynamic CCA threshold.

Referring to FIG. 7, when the first station STA1 intends to transmit a frame, the first station STA1 may set transmission power of the frame (S700). The first station STA1 may denote an AP or a non-AP STA. The first station STA1 may set the transmission power of the frame according to a BSS environment. For example, when a BSS to which the first station STA1 belongs is located indoors, the transmission power of the frame may be set to a value less than or equal to a default value (e.g., 23 dBm) of the transmission power. When the BSS to which the first station STA1 belongs is located outdoors, the transmission power of the frame may be set to a value greater than the default value of the transmission power. When the BSS to which the first station STA1 belongs is in a high density state (e.g., a predetermined number or more of stations are located in the BSS), the transmission power of the frame may be set to a value greater than the default value of the transmission power. When a state of a channel on which the first station STA1 operates is determined to be bad using a received signal strength indicator (RSSI), a received channel power indicator (RCPI), a received signal to noise ratio indicator (RSNI), or the like, the transmission power of the frame may be set to a value greater than the default value of the transmission power. In addition, the first station STA1 may additionally adjust the transmission power of the frame in consideration of a location and a density state of a BSS to which a second station STA2 that will receive a frame belongs, a state of a channel on which the second station STA2 operates, a location of the second station STA2 (e.g., a relative location that is estimated on the basis of a received signal strength of a frame transmitted from the second state STA2), or the like. In this case, the transmission power may be adjusted similarly to the above-described transmission power setting method based on the location of the BSS of the first station STA1, the density state of the BSS, and the channel state. The set transmission power may be applied to a portion of the frame (e.g., a payload included in the frame) or the entirety of the frame. The first station STA1 may set the CCA threshold on the basis of the set transmission power (S710). The first station STA1 may determine the CCA threshold in two methods. In a first method, the first station STA1 may set the CCA threshold on the basis of a predefined mapping table. The mapping table may be the same as the following Table 1. A mapping relation between the transmission power and the CCA threshold is not limited to those described in Table 1 but may be set in various manners.

TABLE 1

| Transmission | CCA Threshold (dBm) | | | | |
|---|---|---|---|---|---|
| power (dBm) | 20 MHz | 40 MHz | 80 MHz | 160 MHz | 320 MHz |
| ~13 | −73 | −70 | −67 | −64 | −61 |
| 14~17 | −76 | −73 | −70 | −67 | −64 |
| 18~21 | −79 | −76 | −73 | −70 | −67 |
| 22~ | −82 | −79 | −76 | −73 | −70 |

In a second method, the first station STA1 may set the CCA threshold on the basis of a difference between the set transmission power and the default value of the transmission power. For example, when the set transmission power is 22 dBm (that is, when the set transmission power is 1 dB less than the default value of the transmission power), the first station STA1 may set the CCA threshold to −81 dBm that is increased by 1 dBm in comparison with the default value of the CCA threshold. That is, the first station STA1 may decrease or increase the CCA threshold below or above the default value of the CCA threshold by a value equal to (or proportional to) the amount of increase or decrease in the set transmission power above or below the default value of the transmission power. Here, the first station STA1 may set the CCA threshold such that signal coverage according to the transmission power is the same as CCA coverage according to the CCA threshold.

The first station STA1 may perform a CCA operation on the basis of the set CCA threshold. When a channel is determined to be in an idle state by the CCA operation, the first station STA1 may transmit the frame at the set transmission power (S720).

Figure 8:
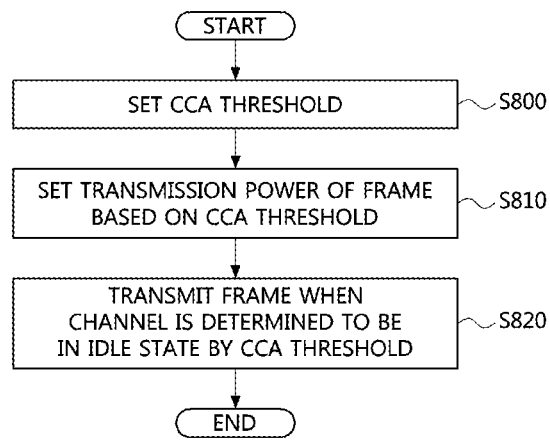
FIG. 8 is a flowchart illustrating a second embodiment of an operation method of a station that performs a CCA operation based on a dynamic CCA threshold.

FIG. 8 is a flowchart illustrating a second embodiment of an operation method of a station that performs a CCA operation based on a dynamic CCA threshold. A difference between the second embodiment and the first embodiment described with reference to FIG. 7 is that the transmission power of the frame is set on the basis of the CCA threshold in the second embodiment, but the CCA threshold is set on the basis of the transmission power of the frame in the first embodiment.

Referring to FIG. 8, when the first station STA1 intends to transmit a frame, the first station STA1 may set the CCA threshold (S800). The first station STA1 may denote an AP or a non-AP STA. The first station STA1 may determine the CCA threshold according to a BSS environment. For example, when a BSS to which the first station STA1 belongs is located indoors, the CCA threshold may be set to less than or equal to the default value (e.g., −82 dBm) of the CCA threshold. When the BSS to which the first station STA1 belongs is located outdoors, the CCA threshold may be set to a value greater than the default value of the CCA threshold. When the BSS to which the first station STA1 belongs is in a high-density state, the CCA threshold may be set to a value greater than the default value of the CCA threshold. When it is determined that a state of a channel on which the first station STA1 operates is bad using the RSSI, RCPI, RSNI, or the like, the CCA threshold may be set to a value greater than the default value of the CCA threshold. In addition, the first station STA1 may additionally adjust the CCA threshold in consideration of a location and a density state of a BSS to which a second station STA2 that will receive a frame belongs, a state of a channel on which the second station STA2 operates, a location of the second station STA2 (e.g., a relative location that is estimated on the basis of a received signal strength of a frame transmitted from the second state STA2), or the like. In this case, the CCA threshold may be adjusted similarly to the above-described CCA threshold setting method based on the location of the BSS of the first station STA1, the density state of the BSS, and the channel state.

The first station STA1 may set the transmission power of the frame on the basis of the set CCA threshold (S810). The first station STA1 may set the transmission power of the frame in two methods. In a first method, the first station STA1 may set the transmission power of the frame on the basis of a mapping table described with reference to Table 1. In a second method, the first station STA1 may set the transmission power of the frame similarly to the above-describe second method described with reference to FIG. 7. That is, the first station STA1 may decrease or increase the transmission power below or above the default value of the transmission power by a value equal to (or proportional to) the amount of increase or decrease in the set CCA threshold above or below the default value of the CCA threshold. Here, the first station STA1 may set the transmission power such that signal coverage according to the transmission power is the same as CCA coverage according to the CCA threshold. The set transmission power may be applied to a portion of the frame (e.g., a payload included in the frame) or the entirety of the frame. The first station STA1 may perform a CCA operation on the basis of the set CCA threshold. When a channel is determined to be in an idle state by the CCA operation, the first station STA1 may transmit the frame at the set transmission power (S820).

The first station STA1 may set the CCA threshold on the basis of an interference strength caused by a frame transmitted from another station.

Figure 9:
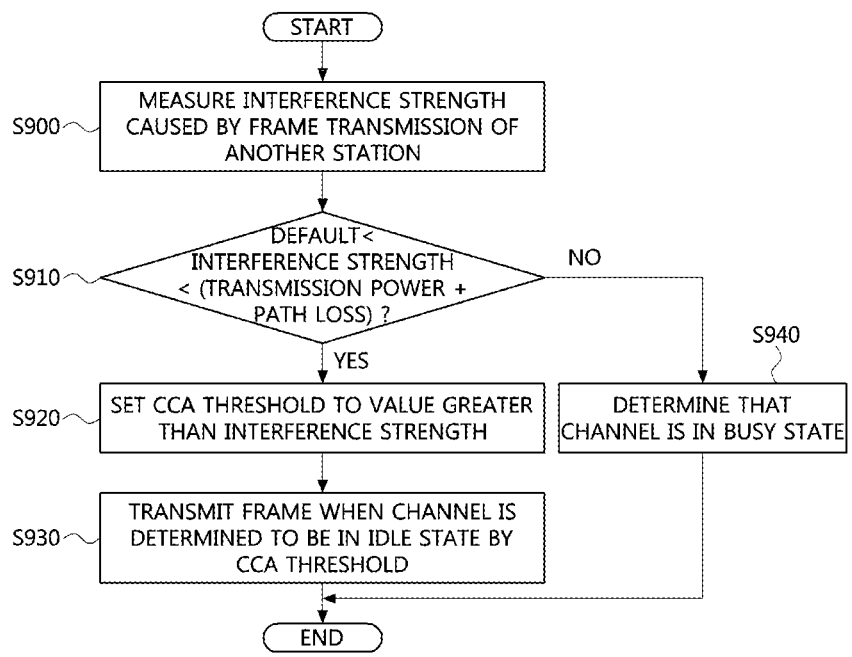
FIG. 9 is a flowchart illustrating a third embodiment of an operation method of a station that performs a CCA operation based on a dynamic CCA threshold.
Figure 10:
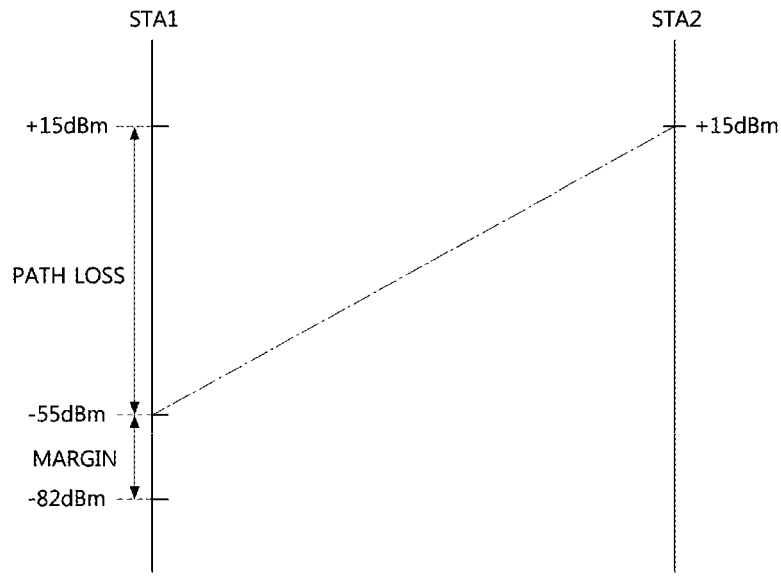
FIG. 10 is a conceptual diagram illustrating a path loss between stations.

FIG. 9 is a flowchart illustrating a third embodiment of an operation method of a station that performs a CCA operation based on a dynamic CCA threshold, and FIG. 10 is a conceptual diagram illustrating a path loss between stations.

Referring to FIGS. 9 and 10, when the first station STA1 intends to transmit a frame to the second station STA2, the first station STA1 may measure an interference strength (that is, a received signal strength) caused by a frame transmitted from another station (S900). Each of the first station STA1 and the second station STA2 may denote an AP or a non-AP STA. The first station STA1 may measure the interference strength by overhearing a frame transmitted from another station. Alternatively, the first station STA1 may receive a frame including interference strength information measured by the second station STA2 from an access point AP to which the second station STA2 or the first station STA1 is associated and may obtain the interference strength information in the second station STA2 therethrough. The interference strength information may denote information from which the inference strength may be inferred (e.g., an MCS of the frame transmitted from the second station STA2). The interference strength may be an interference strength upon transmission of any frame, an average interference strength, an interference strength of the entire bandwidth, an interference strength of a partial bandwidth, or the like.

Here, it is assumed that the first station STA1 may be aware of a path loss (e.g., −70 dBm) between the first station STA1 and the second station STA2. The path loss may denote a path loss from the first station STA1 to the second station STA2 or a path loss from the second station STA2 to the first station STA1. For example, the first station STA1 may estimate a path loss between the first station STA1 and the second station STA2 on the basis of transmission power information included in the frame received from the second station STA2. Alternatively, the first station STA1 may transmit the frame including the transmission power information to the second station STA2, may receive the frame including the estimated path loss information between the first station STA1 and the second station STA2 on the basis of the transmission power information, and may obtain the path loss information therethrough. The first station STA1 may determine whether the interference strength satisfies the following Equation 1 (S910). The first station STA1 may become aware of the transmission power of the second station STA2 by assuming the transmission power of the second station STA2 as the default value or receiving the frame including the transmission power information from an access point AP to which the second station STA2 or the first station STA1 is associated.

$$\text{Default value of CCA threshold} < \text{Interference strength} < (\text{Transmission power of STA2} + \text{Path loss between STA1 and STA2})  \quad \text{[Equation 1]}$$

When the interference strength satisfies Equation 1 (that is, when the interference strength is in a marginal region), the first station STA1 may set the CCA threshold as a value greater than the interference strength (S920). In this case, the set CCA threshold is less than "transmission power of STA2+path loss between STA1 and STA2." The first station STA1 may perform a CCA operation on the basis of the set CCA threshold. When a channel is determined to be in an idle state by the CCA operation, the second station STA2 may transmit the frame (S930). Here, the first station STA1 may set the transmission power of the frame on the basis of the CCA threshold according to the second embodiment described above with reference to FIG. 8 and may transmit the frame to the second station STA2 at the set transmission power. On the contrary, when the interference strength does not satisfy Equation 1 (that is, when the interference strength is greater than or equal to "transmission power of STA2+ path loss between STA1 and STA2"), the first station STA1 may determine that the channel is in a busy state (S940).

When the channel is determined to be in an idle state through S930, the first station STA1 may additionally consider the following Equation 2. That is, the first station STA1 may additionally consider whether the second station STA2 can perform decoding in an interference environment. The first station STA1 may transmit a frame when the following Equation 2 is satisfied (that is, when the second station STA2 can perform decoding). Here, the interference strength may denote a relative value with respect to any reference value, and the reference value may be different from the CCA threshold.

$$(\text{Interference strength} + \text{Required SNR}) < (\text{Transmission power of STA1} + \text{Path loss between STA1 and STA2}) \quad \text{[Equation 2]}$$

A signal to noise ratio (SNR) (or signal to interference plus noise ratio (SINR)) required in Equation 2 may vary depending on an MCS of a frame to be transmitted from the first station STA1. The station STA1 may adjust the MCS of the frame (that is, adjust the MCS to below the current MCS) or increase the transmission power such that Equation 2 is satisfied.

When the channel is determined to be in an idle state through S930, the first station STA1 may additionally consider the following Equation 3 or 4. That is, the first station STA1 may consider interference in another station (e.g., a third station STA3, a fourth station STA4, or the like) in addition to the second station STA2. When the interference in the other station satisfies a predefined reference, the first station STA1 may transmit a frame to the other station. Here, a margin of the interference strength may denote a relative value with respect to any reference value, and the reference value may be different from the CCA threshold.

Default value of CCA threshold≥(Transmission power of STA1+Path loss between STA1 and STA3) [Equation 3]

Margin of interference strength>(Transmission power of STA1+Path loss between STA1 and STA3) [Equation 4]

The first station STA1 may become aware of the transmission power of the third station STA3 by assuming the transmission power of the third station STA3 as the default value or receiving the frame including the transmission power information from an access point AP to which the third station STA3 or the first station STA1 is associated. The first station STA1 may become aware of a received signal strength of a frame by overhearing the frame from the third station STA3 and may estimate a path loss between the first station STA1 and the third station STA3 on the basis of the transmission power and the received signal strength of the first station STA3. The first station STA1 may become aware of the CCA threshold used by the third station STA3 by assuming the CCA threshold of the third station STA3 as the default value or receiving the frame including the CCA threshold from an access point AP to which the third station STA3 or the first station STA1 is associated. In addition, the first station STA1 may obtain identification information (e.g., a MAC address, an association ID (AID), a partial AID (PAID), and so on) by overhearing a frame transmitted from the third stations S3. When the first station STA1 does not currently overhear the frame transmitted from the third station STA3 (or when the first station STA1 is overhearing the frame or the decoding of the frame is not completed, when the decoding of the frame is completed but the information associated with the third station STA3 is not included in the frame, etc.), the information associated with the third station STA3 may be obtained through the frame that is previously received from the third station STA3. The first station STA1 may determine whether Equation 3 is satisfied on the basis of the obtained information and may transmit the frame when Equation 3 is satisfied. In this case, the first station STA1 may set the transmission power as a maximum value satisfying Equation 3.

The first station STA1 may become aware of a margin of interference strength of the third station STA3 by receiving a frame including margin information (e.g., a receive signal strength that may be decoded at the maximum MCS) regarding an interference strength from an access point AP to which the second station STA2 or the first station STA1 is associated. The first station STA1 may determine whether Equation 4 is satisfied on the basis of the margin of the interference strength and may transmit the frame when Equation 4 is satisfied. In this case, the first station STA1 may set the transmission power as a maximum value satisfying Equation 4. Alternatively, the first station STA1 may determine whether the following Equation 5 is satisfied when the first station STA1 may be aware of the current interference strength of the third station STA3 by receiving the frame including the current interference strength information from an access point AP to which the third station STA3 or the first station STA1 is associated. That is, the first station STA1 may transmit a frame when Equation 5 is satisfied and may set the transmission power as a maximum value satisfying Equation 5.

Margin of interference strength>(Current interference strength+Transmission power of STA1+Path loss between STA1 and STA3) [Equation 5]

When the frame is transmitted or received through spatial reuse (that is, when 'frame transmission/reception between STA1 and STA2' and 'frame transmission between STA3 and STA4' may be performed at the same time), the first station STA1 may determine whether to transmit the frame in consideration of interference exerted on the fourth station STA4 in addition to the third station STA3. That is, the first station STA1 may obtain information associated with the fourth station STA4 similarly to the above-described method of obtaining the information associated with the third station STA3. When the first station STA1 does not currently overhear the frame transmitted from the fourth station STA4 (or when the first station STA1 is overhearing the frame or the decoding of the frame is not completed, when the decoding of the frame is completed but the information associated with the fourth station STA4 is not included in the frame, etc.), the information associated with the fourth station STA4 may be obtained through the frame that is previously received from the fourth station STA4. The first station STA1 may determine whether to transmit the frame by determining whether to satisfy Equations 3, 4, and 5 on the basis of the information associated with the fourth station STA4. The station STA1 may transmit the frame when at least one of the above-described Equations 1 to 5 is satisfied.

The first station STA1 may set the CCA threshold on the basis of a characteristic of the frame to be transmitted.

Figure 11:
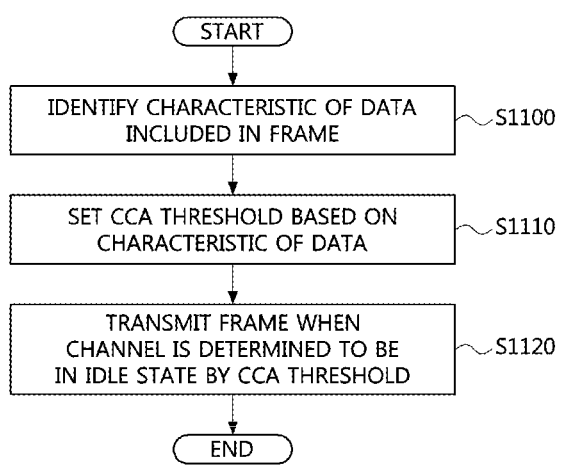
FIG. 11 is a flowchart illustrating a fourth embodiment of an operation method of a station that performs a CCA operation based on a dynamic CCA threshold.

FIG. 11 is a flowchart illustrating a fourth embodiment of an operation method of a station that performs a CCA operation based on a dynamic CCA threshold.

Referring to FIG. 11, when the first station STA1 intends to transmit a frame, the first station STA1 may identify the characteristic of the data included in the frame (S1100) and may set the CCA threshold on the basis of the characteristic of the data (S1110). The first station STA1 denotes an AP or a non-AP STA. As shown in the following Table 2, the first station STA1 may classify the characteristic of the data into delay sensitive data (e.g., VoIP data, data associated with a video conference, data associated with wireless docking, etc.) and delay insensitive data (e.g., data associated with a background, data transmitted in a best effort scheme, etc.)

TABLE 2

| Data characteristic | CCA Threshold |
| --- | --- |
| Data sensitive to delay | −72 dBm |
| Data insensitive to delay | −82 dBm |

When the characteristic of the data included in the frame is the delay sensitive data, the first station STA1 may set the CCA threshold to a value greater than the default value of the CCA threshold. On the contrary, when the characteristic of the data included in the frame is the delay insensitive data, the first station STA1 may set the CCA threshold to a value less than or equal to the default value of the CCA threshold. Alternatively, the first station STA1 may classify the characteristic of the data into voice data (VO), video data (VI), data transmitted in a best effort scheme (BE), and background data (BK) according to a transmission priority, as shown in the following Table 3.

TABLE 3

| Data characteristic | CCA Threshold |
|---|---|
| VO | −67 dBm |
| VI | −72 dBm |
| BE | −77 dBm |
| BK | −82 dBm |

When the characteristic of the data included in the frame is BK, the first station STA1 may set the CCA threshold to the default value of the CCA threshold. When the characteristic of the data included in the frame is BE, the first station STA1 may set the CCA threshold to a value greater than the CCA threshold that is set for BK. When the characteristic of the data included in the frame is VI, the first station STA1 may set the CCA threshold to a value greater than the CCA threshold that is set for BE. When the characteristic of the data included in the frame is VO, the first station STA1 may set the CCA threshold to a value greater than the CCA threshold that is set for VI. Here, the CCA threshold according to the characteristic of the data included in the frame may not be limited to those described in Tables 2 and 3 but may be set in various manners.

The first station STA1 may perform a CCA operation based on the set CCA threshold. When a channel is determined to be in an idle state by the CCA operation, the first station STA1 may transmit a frame (S1120). Here, the first station STA1 may set the transmission power of the frame on the basis of the CCA threshold according to the second embodiment described above with reference to FIG. 8 and may transmit the frame at the set transmission power.

When the CCA threshold is increased by the above-described methods, stations using the fixed CCA thresholds do not obtain a frame transmission opportunity. Thus, a method for securing fairness between the stations is needed. In a first method, the first station STA1 may set the CCA threshold in consideration of a BSS to which its adjacent stations belong.

Figure 12:
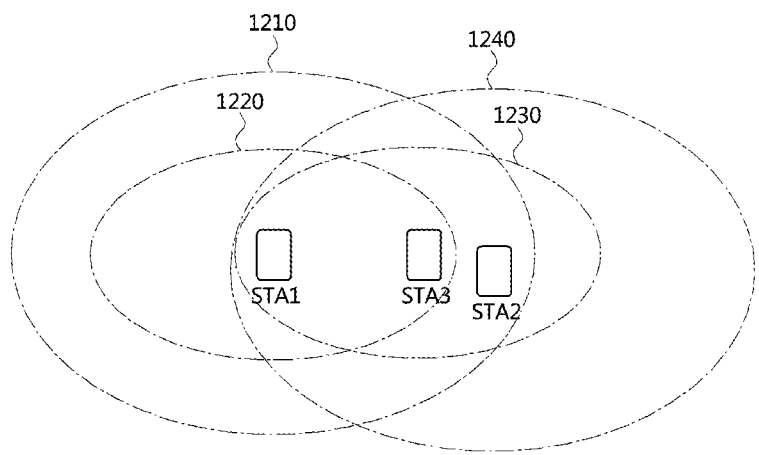
FIG. 12 is a conceptual diagram illustrating a second scenario of a WLAN.
Figure 13:
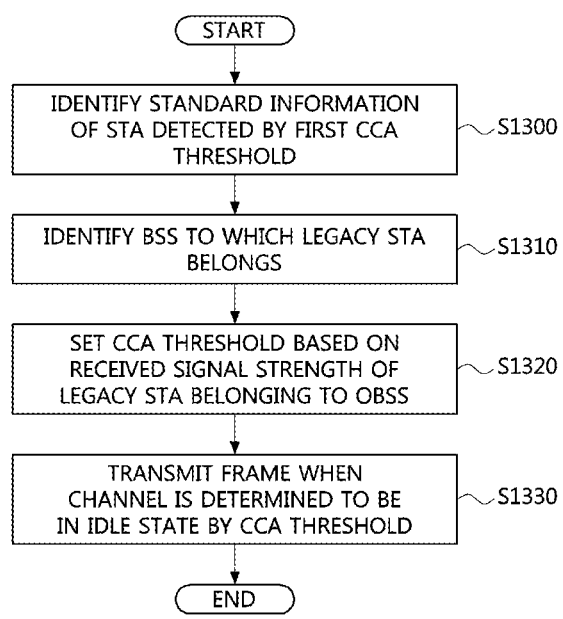
FIG. 13 is a flowchart illustrating a fifth embodiment of an operation method of a station that performs a CCA operation based on a dynamic CCA threshold.

FIG. 12 is a conceptual diagram illustrating a second scenario of a WLAN, and FIG. 13 is a flowchart illustrating a fifth embodiment of an operation method of a station that performs a CCA operation based on a dynamic CCA threshold.

Referring to FIGS. 12 and 13, when the first station STA1 intends to transmit a frame to the third station STA3, the first station STA1 may perform a CCA operation based on a first CCA threshold. Each of the first station STA1, the second station STA2, and the third station STA3 may denote an AP or a non-AP STA. The first CCA threshold may denote the default value of the CCA threshold. Here, first CCA coverage 1210 and second CCA coverage 1220 may denote coverage according to the first CCA threshold and the second CCA threshold of the first station STA1, respectively. Third CCA coverage 1230 may denote coverage according to the third CCA threshold of the third station STA3. The third CCA threshold may be the same as the second CCA threshold. Fourth CCA coverage 1240 may denote coverage according to the fourth CCA threshold of the second station STA2. The fourth CCA threshold may be the same as the first CCA threshold.

The first station STA1 may obtain a frame having a received signal strength greater than the first CCA threshold and may identify standard information that is supported by the second station STA2 that has transmitted the frame (S1300). The first station STA1 may identify the standard information supported by the second station STA2 by performing an auto detection operation for a preamble included in the frame that is transmitted from the second station STA2. For example, when it is identified, by the auto detection operation, that the second station STA2 supports the IEEE 802.11 standard (e.g., IEEE 802.11a/b/g/n/ac), which is a version lower than the IEEE 802.11ax standard, the first station STA1 that supports the IEEE 802.11ax standard may determine the second station STA2 as a legacy station.

The first station STA1 may identify a BSS to which the second station STA2 determined as the legacy station belongs (S1310). The first station STA1 may identify the BSS to which the second station STA2 belongs on the basis of information (e.g., a color bit defined in the IEEE 802.11ah, information associated with BSS identification (BSSID), etc.) included in an SIG field of a preamble of the frame transmitted from the second station STA2 or information (e.g., address information set in an address field, BSSID etc.) included in an MAC header of the frame.

When the second station STA2 determined as the legacy station belongs to an overlapping BSS (OBSS), the first station STA1 may set its own CCA threshold to a second CCA threshold, which is a value greater than the first CCA threshold (S1320). Here, a PHY processor 11 of the first station STA1 may transmit, to an MAC processor 15 of the first station STA1, information regarding whether the received signal strength of the frame transmitted from the second station STA2 falls within one of a first region less than or equal to the first CCA threshold, a second region greater than the first CCA threshold and less than or equal to the second CCA threshold, and a third region greater than the second CCA threshold (e.g., log 2(n+1) bit (n=1 when the received signal strength falls within the first region; n=2 when the received signal strength falls within the second region; and n=3 when the received signal strength falls within the third region)). Alternatively, the PHY processor 11 of the first station STA1 may transmit, to the MAC processor 15 of the first station STA1, a quantized value of the received signal strength of the frame transmitted from the second station STA2.

The MAC processor 15 of the first station STA1 may change its own CCA threshold from the first CCA threshold to the second CCA threshold on the basis of information or a value transmitted from the PHY processor 11 of the first station STA1. For example, when the received signal strength of the frame transmitted from the second station STA2 falls within the second region, the MAC processor 15 of the first station STA1 may change its own CCA threshold from the first CCA threshold to the second CCA threshold. Alternatively, when the received signal strength of the frame transmitted from the second station STA2 belonging to the OBSS falls within the second region and the frame is an uplink frame, the MAC processor 15 of the first station STA1 may change its own CCA threshold from the first CCA threshold to the second CCA threshold. On the contrary, when the received signal strength of the frame transmitted from the second station STA2 belonging to the OBSS falls within the second region and the frame is a downlink frame, the MAC processor 15 of the first station STA1 may not change its own CCA threshold. Alternatively, when the signal strength of the frame transmitted from the second station STA2 belonging to the OBSS falls within the second region and the frame is a frame associated with direct communication (e.g., device-to-device (D2D) communication) between the stations, the MAC processor 15 of the first station STA1 may change its own CCA threshold from the first threshold to the second CCA threshold.

When a channel is determined to be in an idle state by the CCA operation based on the CCA threshold, the first station STA1 may transmit the frame to a first access point AP1 (S1330). Here, the first station STA1 may set the transmission power of the frame on the basis of the second CCA threshold according to the second embodiment described above with reference to FIG. 8 and may transmit the frame at the set transmission power.

In a second method for securing fairness between stations, the first station STA1 may transmit the frame in consideration of a channel state of a station that is to receive the frame.

Figure 14:
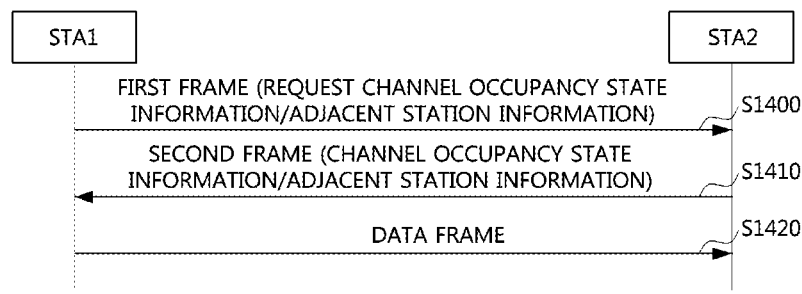
FIG. 14 is a sequence chart illustrating a method of transmitting a frame on the basis of a channel state of a station.

FIG. 14 is a sequence chart illustrating a method of transmitting a frame based on a channel state of a station.

Referring to FIG. 14, when the first station STA1 intends to transmit a data frame to the second STA2, the first station STA1 may determine a channel occupancy state by performing the CCA operation. Each of the first station STA1 and the second station STA2 may denote an AP or a non-AP STA. When a channel is determined to be in an idle state by one of the above-described methods, the first station STA1 may request provision of at least one of channel occupancy state information and adjacent station information of the second station STA2 by transmitting a first frame to the second station STA2 (S1400). The first frame may include an indicator requesting the provision of at least one of the channel occupancy state information and the adjacent station information of the second station STA2. The indicator may be included in an MAC header or a preamble (that is, an SIG field of the preamble) of the first frame. In addition, a capability bit indicating that a transmission/reception operation of at least one of the channel occupancy state information and the adjacent station information is supported may be set in the first frame.

In addition, the first frame may include at least one of the channel occupancy state information (that is, information indicating an idle state) and the adjacent station information of the first station STA1. Each of the channel occupancy state information and the adjacent station information of the first station STA1 may be included in the MAC header or the preamble (that is, the SIG field of the preamble) of the first frame. The first station STA1 may generate the adjacent station information by obtaining frames transmitted from its adjacent stations. The adjacent station information may include at least one of identification information (e.g., an MAC address, an AID, a PAID, etc.) of an adjacent station, standard information (e.g., IEEE 802.11 a/b/g/n/ac/ax) supported by the adjacent station, information (e.g., regarding whether belonging to the BSSID or OBSS) associated with a BSS to which the adjacent station belongs, information (e.g., a region within which the received signal strength falls, a value obtained by quantizing the received signal strength, etc. described above with reference to FIGS. 12 and 13) associated with a received signal strength of a frame transmitted from the adjacent station, and information (e.g., a value of a duration field included in the frame transmitted from the adjacent station, a channel occupancy time calculated on the basis of an MCS and a length of the frame, etc.) regarding a time during which the adjacent station occupies the channel.

Upon receiving the first frame, the second station STA2 may transmit a second frame to the first station STA1 in response to the first frame (S1410). The second station STA2 may transmit the second frame to the first station STA1 after the SIFS from an end time point of the first frame. In this case, the first frame/second frame may denote an RTS frame/CTS frame, a data frame/ACK frame, and a power saving (PS)-Poll frame/ACK frame, in which the SIFS exists between transmissions of the frames. Alternatively, the second station STA2 may receive the first frame and then transmit the second frame to the first station STA1 after a contention window according to a random backoff operation when a channel is determined to be in an idle state by the CCA operation.

The second frame may include a capability bit similarly to the first frame and include channel occupancy state information (that is, information indicating an idle state or a busy state) and adjacent station information of the second station STA2. Each of the channel occupancy state information and the adjacent station information of the second station STA2 may be included in the MAC header or the preamble of the second frame. An information type included in the adjacent station information of the second station STA2 may be the same as the above-described information type included in the adjacent station information of the first station STA1. Here, when the channel is determined to be in a busy state by a CCA operation based on the default value of the CCA threshold but determined to be in an idle state by a CCA operation based on a value greater than the default value of the CCA threshold (that is, when the spatial reuse is determined to be possible), the second station STA2 may transmit the second frame including information indicating that the channel is in an idle state to the first station STA1.

Upon receiving the second frame, the first station STA1 may determine whether to transmit the frame on the basis of information included in the second frame. That is, when a channel of the second station STA2 is identified to be in an idle state through the information included in the second frame, the first station STA1 may transmit a data frame to the second station STA2 (S1420). For example, on a condition that a received signal strength of the third station STA3 included in adjacent station information of the second frame does not exceed a predefined threshold (that is, interference caused by the third station STA3 is not great), when the first station STA1 does not detect the third station STA3 or the received signal strength of the third station STA3 obtained by the first station STA1 is less than the received signal strength of the third station STA3 obtained by the second station STA2, the first station STA1 may determine that the spatial reuse is possible. Accordingly, the first station STA1 may transmit the data frame to the second station STA2. Here, the first station STA1 may set the transmission power of the frame on the basis of the CCA threshold according to the second embodiment described above with reference to FIG. 8 and may transmit the frame at the set transmission power.

In a third method for securing fairness between stations, the first station STA1 may transmit a frame through beamforming (that is, beamforming defined in the IEEE 802.11ac) or a sectored beam (that is, a sector beam defined in the IEEE 802.11ah).

Figure 15:
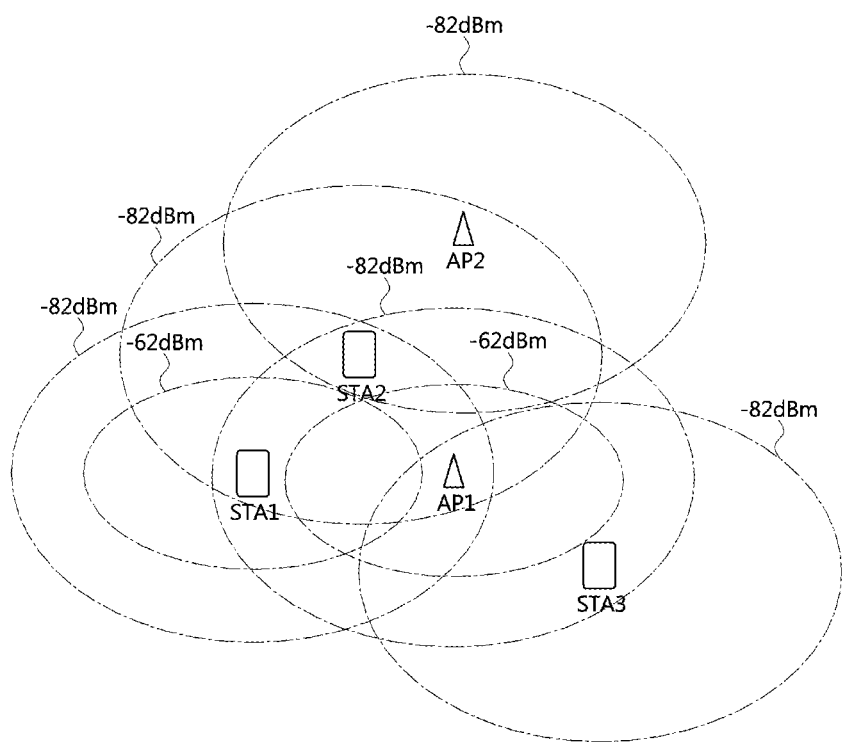
FIG. 15 is a conceptual diagram illustrating a third scenario of a WLAN.
Figure 16:
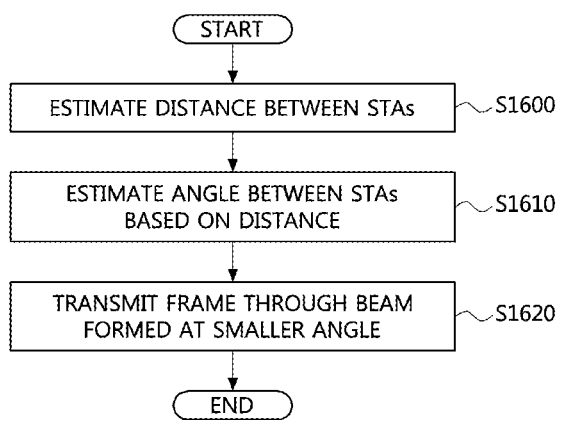
FIG. 16 is a flowchart illustrating a method of transmitting a frame through beamforming or a sector beam.

FIG. 15 is a conceptual diagram illustrating a third scenario of a WLAN, and FIG. 16 is a flowchart illustrating a method of transmitting a frame through beamforming or a sector beam.

Referring to FIGS. 15 and 16, when performing a CCA operation based on the CCA threshold of −62 dBm, each of the first station STA1 and the first access point AP1 may determine that the channel is in an idle state, regardless of the frame transmitted from the second station STA2. In this case, in order to reduce interference in the second station STA2, the first station STA2 may transmit the frame to the first access point AP1 on the basis of transmission power having coverage corresponding to CCA coverage according to the CCA threshold of −62 dBm. However, in this case, the first access point AP1 may not receive the frame successfully because the receive signal strength of the frame transmitted from the first station STA1 is not sufficient. In order to solve the problem, the first station STA1 may transmit the frame to the first access point AP1 through the beamforming or sector beam.

Each of the first station STA1 and the first access point AP1 may estimate a path loss on the basis of a transmission power strength and a reception power strength of the frame and may estimate a distance between the first station STA1 and the first access point AP1 (hereinafter, referred to as a first link), a distance between the first station STA1 and the second station STA2 (hereinafter, referred to as a second link), and a distance between the first access point AP1 and the second station STA2 (hereinafter, referred to as a third link) on the basis of the estimated path loss (S1600). Here, the distance of the link may be estimated on the basis of the path loss and the channel model. The channel model may denote a free space model, a channel model (e.g., an indoor/outdoor channel model) defined in the IEEE 802.11 standard, etc. The first station STA1 may not estimate a distance of the third link and thus may obtain distance information of the third link from the first access point AP1. For example, the first station STA1 may obtain the distance information of the third link from the first access point AP1 through an exchange operation between the first frame and the second frame, which is described above with reference to FIG. 14. The access point AP1 may not estimate a distance of the second link and thus obtain distance information regarding the second link from the first station STA1. For example, the access point AP1 may obtain distance information of the second link from the first station STA1 through an exchange operation between the first frame and the second frame, which is described above with reference to FIG. 14.

Each of the first station STA1 and the first access point AP1 may estimate a location of the second station STA2 on the basis of the distance of the first link, the distance of the second link, and the distance of the third link and may estimate an angle between the first link and the second station STA2 on the basis of the estimated location (S1610).

The first station STA1 may form a beam at an angle that is less than two times the angle between the first link and the second station STA2 and transmit the frame to the first access point AP1 through the formed beam (S1620). Here, the first station STA1 may transmit a preamble of the frame in an Omni scheme and transmit a payload of the frame to the first access point AP1 through the beam. The preamble of the frame may be transmitted as the default value of the transmission power. In addition, the first station STA1 may obtain a signal to interference plus noise ratio (SINR) of the first access point AP1 from the first access point AP1 through an exchange operation between the first frame and the second frame, which is described above with reference to FIG. 14, estimate an MCS index by performing link adaptation on the basis of the SINR, and transmit the frame using the estimated MCS index, thus enhancing transmission efficiency.

When the CCA threshold is dynamically changed, the following hidden node problem may occur.

Figure 17:
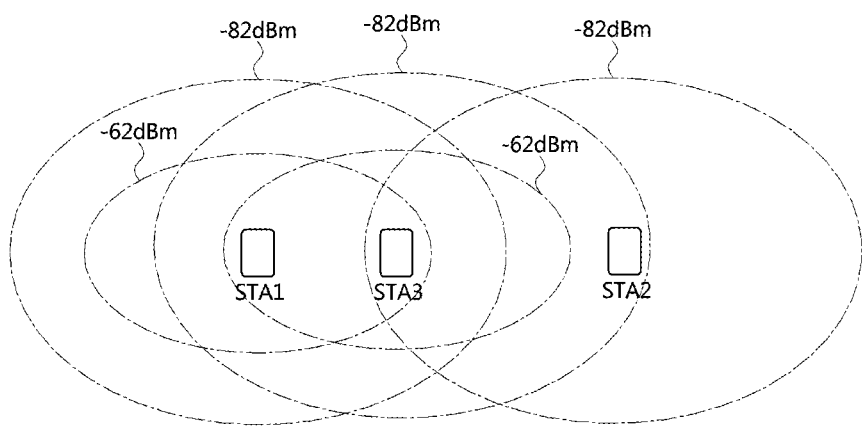
FIG. 17 is a conceptual diagram illustrating a fourth scenario of a WLAN.

FIG. 17 is a conceptual diagram illustrating a fourth scenario of a WLAN.

Referring to FIG. 17, the third station STA3 may be aware of the existence of the first station STA1 and the second station STA2. The first station STA1 and the second station STA2 is a hidden node relationship. Each of the first station STA1, the second station STA2, and the third station STA3 may denote an AP or a non-AP STA. That is, when the channel is in an idle state, the first station STA1 may transmit the frame to the third station STA3. When the channel is determined to be in an idle state although the frame is transmitted from the first station STA1, the second station STA2 may transmit the frame to the third station STA3. In this case, the third station STA3 does not receive any frame successfully because there is a collision between the frame transmitted from the first station STA1 and the frame transmitted from the second station STA2.

In a first method for solving the hidden node problem, the station may transmit the frame that may be received by all stations belonging to CCA coverage according the default value of the CCA threshold.

Figure 18:
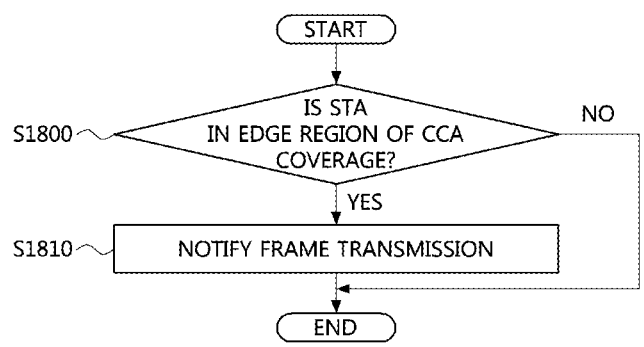
FIG. 18 is a flowchart illustrating a first operation method of a station in order to solve a hidden node problem.

FIG. 18 is a flowchart illustrating a first operation method of a station in order to solve a hidden node problem.

Referring to FIG. 18, it is assumed that the first station STA1 performs a CCA operation based on a second CCA threshold that is greater than a first CCA threshold (e.g., the default value of the CCA threshold), and the first station STA1 transmits the frame based on second transmission power that is less than the first transmission power (e.g., the default value of the transmission power). First CCA coverage according to the first CCA threshold may correspond to signal coverage according to the first transmission power, and second CCA coverage according to the second CCA threshold may correspond to signal coverage according to the second transmission power.

When the first station STA1 intends to transmit the frame to the second station STA2, the first station STA1 may identify whether the third station STA3 exists in an edge region of the CCA coverage (S1800). Each of the first station STA1, the second station STA2, and the third station STA3 may denote an AP or a non-AP STA. The edge region of the CCA coverage may denote a region between the first CCA coverage and the second CCA coverage. When the received signal strength of the frame transmitted from the third station STA3 is greater than the first CCA threshold and less than the second CCA threshold, the first station STA1 may determine that third station STA3 is located in the edge region of the CCA coverage.

When the third station STA3 is located in the edge region of the CCA coverage, the first station STA1 may notify the third station STA3 that the frame is to be transmitted (S1810). For example, when the first station STA1 transmits the frame to the second station STA2, the first station STA1 may notify the third station STA3 that the frame is to be transmitted by transmitting a portion of the preamble of the frame on the basis of the first transmission power and transmitting the remaining portion on the basis of the second transmission power. Alternatively, the first station STA1 may transmit the frame including information indicating that the frame is to be transmitted on the basis of the first transmission power and then transmit the frame to the second station STA2 on the basis of the second transmission power.

In a second method for solving the hidden node problem, the station may identify a hidden node by performing a CCA operation based on a value smaller than the default value of the CCA threshold.

Figure 19:
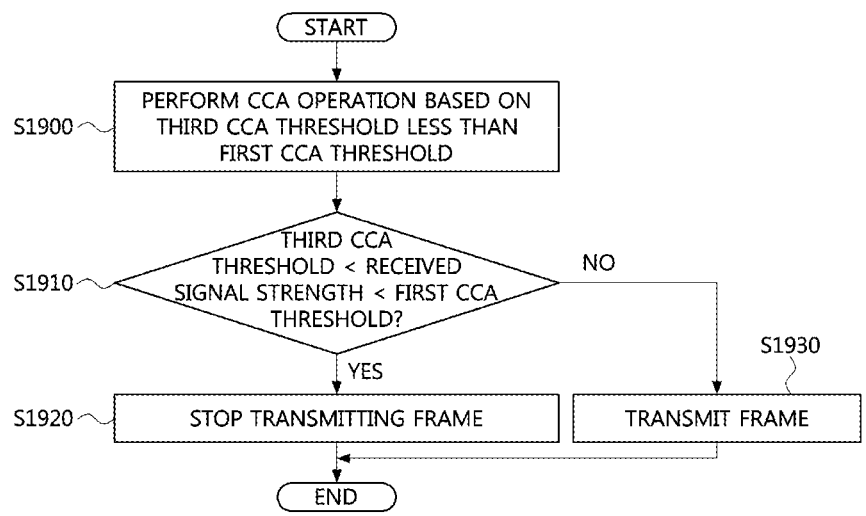
FIG. 19 is a flowchart illustrating a second operation method of a station in order to solve a hidden node problem.

FIG. 19 is a flowchart illustrating a second operation method of a station in order to solve a hidden node problem.

Referring to FIG. 19, the first station STA1 may perform a CCA operation based on the third CCA threshold less than the first CCA threshold (e.g., the default value of the CCA threshold) (S1900). The first station STA1 denotes an AP or a non-AP STA. When the received signal strength of the received frame is greater than the third CCA threshold and less than the first CCA threshold, the first station STA1 may determine that there is a hidden node (S1910). The first station STA1 may stop transmitting a frame when there is a hidden node (S1920) and may transmit the frame when there is no hidden node (S1930).

A frame transmission method based on the above-described methods is as follows.

Figure 20:
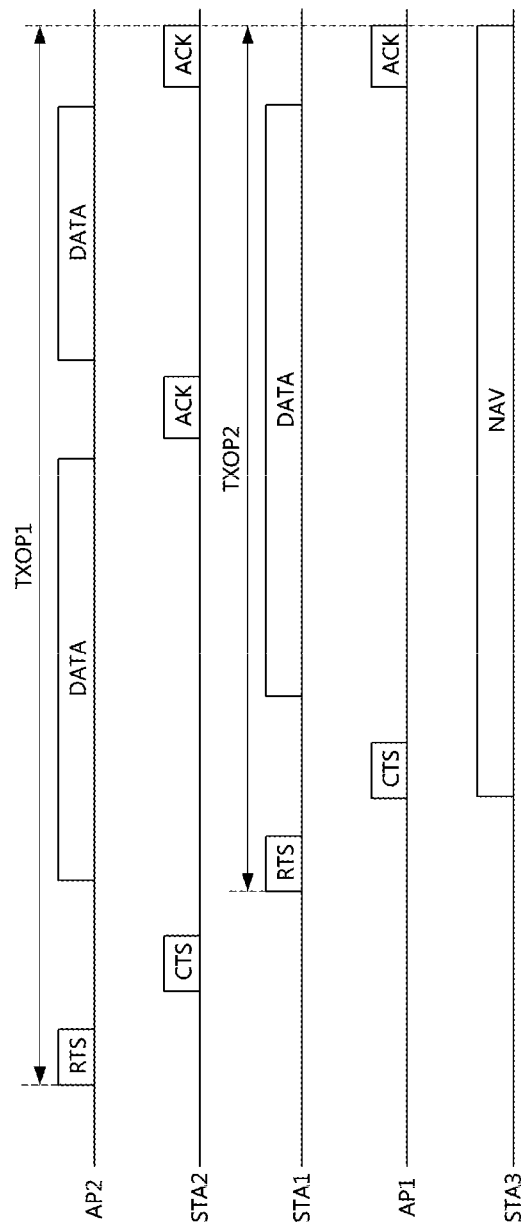
FIG. 20 is a timing diagram illustrating a frame transmission/reception method in a WLAN.

FIG. 20 is a timing diagram illustrating a frame transmission/reception method in a WLAN.

Referring to FIG. 20, the arrangement of the first access point AP1, the second access point AP2, the first station STA1, the second station STA2, and the third station STA3 may be similar to that illustrated in FIG. 15. However, a difference with FIG. 15 is that the first access point AP1 may be located within the CCA coverage according to the CCA threshold of −62 dBm of the first station STA1, and the first station STA1 may be located within the CCA coverage according to the CCA threshold of −62 dBm of the first access point AP1.

The second access point AP2 may transmit an RTS frame including duration information of TXOP1 to the second station STA2. Upon receiving the RTS frame, the second station STA2 may transmit a CTS frame in response to the RTS frame. The CTS frame may include duration information of "TXOP1−(start time point of CTS−start time point of RTS)." When spatial reuse is possible through at least one of CCA threshold adjustment, transmission power adjustment, and transmission through a beam such as the above-described methods, the first station STA1 may transmit a RTS frame including duration information of TXOP2 to the first access point AP1.

Upon receiving the RTS frame, the first access point AP1 may transmit a CTS frame in response to the RTS frame. The CTS frame may include duration information of "TXOP2−(start time point of CTS−start time point of RTS)." The third station STA3 may receive the CTS frame transmitted from the first access point AP1 and may set a NAV timer on the basis of a value that is set in a duration field of the CTS frame. That is, the first station STA3 may set the NAV timer to the end time point of TXOP2.

Upon receiving the CTS frame from the first access point AP1, the first station STA1 may generate a data frame in consideration of the end time point of TXOP2 and may transmit the generated data frame to the first access point AP1. Upon successfully receiving the data frame from the first station STA1, the first access point AP1 may transmit an ACK frame to the first station STA1. Here, the first station STA1 and the first access point AP1 may transmit a frame (that is, an RTS frame, CTS frame, data frame, or ACK frame) at a value less than the default value of the transmission power or may transmit the frame through beamforming or a sector beam.

According to an embodiment of the present invention, when the CCA threshold is increased, transmission power may be decreased, thus fairness between stations and performance of the WLAN upon frame transmission may be enhanced. In addition, the CCA threshold may be adjusted in consideration of interference between adjacent stations, the type of a frame to be transmitted, a BSS, and an occupancy state of a channel on which a reception station operates, thus fairness between stations and performance of the WLAN upon frame transmission may be enhanced. In addition, a hidden node problem may be solved by transmitting a frame that can be received by all stations within CCA coverage (in particular, stations located in an edge region) or performing a CCA operation based on a value less than a default value of a CCA threshold. Furthermore, frame transmission may be performed through a beam in consideration of locations of adjacent stations, thereby performance of the WLAN may be enhanced through spatial reuse.

While the example embodiments of the present invention and their advantages have been described in detail, it should be understood that various changes, substitutions and alterations may be made herein without departing from the scope of the invention.

What is claimed is:

1. An operation method performed by a first station, the operation method comprising:

identifying standard information supported by a second station that has transmitted a frame detected by a CCA operation based on a first clear channel assessment (CCA) threshold;

when a standard supported by the second station is a lower version than a standard supported by the first station, identifying a basic service set (BSS) to which the second station belongs;

when the second station belongs to an overlapping BSS (OBSS), changing a CCA threshold of the first station to a second CCA threshold greater than the first CCA threshold; and performing a CCA operation based on the second CCA threshold.

2. The operation method of claim 1, further comprising:

setting transmission power of the frame to a value less than a default value of the transmission power; and when a channel is determined to be in an idle state by a CCA operation based on the second CCA threshold, transmitting a frame at the set transmission power.

3. The operation method of claim 1, wherein the standard information supported by the second station is identified by an auto detection operation on a preamble of the frame.

4. The operation method of claim 1, wherein the BSS to which the second station belongs is identified by BSS indicating information included in a preamble of the frame or BSS indicating information included in a medium access control (MAC) header of the frame.

5. The operation method of claim 1, wherein the first CCA threshold is changed to the second CCA threshold when a received signal strength of the frame is greater than the first CCA threshold and less than the second CCA threshold.

6. The operation method of claim 1, wherein the first CCA threshold is changed to the second CCA threshold when the frame is an uplink frame or a frame used for direct communication between stations.

* * * * *